| United States Patent [19] | [11] Patent Number: 4,656,543 |
|---|---|
| Oosaka et al. | [45] Date of Patent: Apr. 7, 1987 |

[54] DEVICE FOR FIXING A REGULATING PLATE OF A MAGNETIC DISC DEVICE

[75] Inventors: Shigenori Oosaka; Naoki Takatori, both of Tokyo, Japan

[73] Assignee: Fuji Photo Film Co., Ltd., Minami-ashigara, Japan

[21] Appl. No.: 757,167

[22] Filed: Jul. 22, 1985

[30] Foreign Application Priority Data

Jul. 26, 1984 [JP] Japan .......................... 59-113967[U]

[51] Int. Cl.$^4$ .............................................. G11B 17/02
[52] U.S. Cl. ........................................ 360/97; 360/99; 360/130.34
[58] Field of Search .................................. 360/97–99, 360/130.34

[56] References Cited

U.S. PATENT DOCUMENTS 4,466,032 8/1984 Saito ...................................... 360/97

*Primary Examiner*—Robert S. Tupper
*Attorney, Agent, or Firm*—Parkhurst & Oliff

[57] ABSTRACT

A magnetic disc device applicable to an electronic still camera system or a reproducer in an electronic camera system, wherein a subject is still-photographed pure-electronically and recorded into a rotating magnetic disc, and the reproduction of an image is carried out by a television, a printer or the like.

A lid of this magnetic disc device is provided with a regulating plate at a position opposed to a magnetic head, for disposing the magnetic disc along the magnetic head. The regulating plate is finely movably provided on the lid, and attracted and fixed by magnets, when the lid is closed, whereby, even if the regulating plate is finely movably provided such that the regulating plate can be positioned at a predetermined position, the regulating plate can be held unmovably at the time of the reproduction of the magnetic record when the lid is closed.

4 Claims, 5 Drawing Figures

DEVICE FOR FIXING A REGULATING PLATE OF A MAGNETIC DISC DEVICE

BACKGROUND OF THE INVENTION

1. Field of the Invention

This invention relates to a magnetic disc device, and particularly to a magnetic disc device for use in a magnetic recorder or a reproducer for an electronic camera and the like capable of magnetically recording still image information and the like.

2. Description of the Prior Art

Recently, there has been developed an electronic still camera system wherein an image pickup device such as a charge coupled device (CCD) or an image pickup tube is combined with a recording device using an expensive magnetic disc as a recording medium and having a comparatively high memory capacity, wherein a subject is electronically still-photographed and recorded on a rotating magnetic disc, and the reproduction of an image is carried out by a television, a printer or the like.

The magnetic disc utilized in the above-described system is generally in the form of a magnetic disc pack. This magnetic disc pack has rotatably mounted therein a magnetic disc capable of magnetically recording still image information and the like thereon, and is installed on a magnetic recorder assembled into an electronic camera, or on a reproducer integrally formed on the magnetic recorder or separately formed therefrom.

With a rotary magnetic disc device of this type, in order to improve the recording and reproducing reliability, it is necessary to bring the magnetic head into stable contact with the magnetic disc rotating at high speed. For this purpose, there has heretofore been adopted an arrangement wherein a regutating plate is provided in opposed relationship to the magnetic head, with the magnetic disc being interposed therebetween. An air stream between this regulating plate and the magnetic disc causes the magnetic disc to be in stable contact with the magnetic head. However, if this regulating plate is inclined, the relationship between the magnetic disc and the magnetic head changes or the regulating plate is shifted from a predetermined position relative to the magnetic head, then an effect cannot be expected from the regulating plate.

Because of this, the regulating plate is secured to a main body of a device in such a manner as to be finely movable relative thereto, whereby the regulating plate is set at an optimal position through positioning means. Notwithstanding, when the regulating plate is finely movable, if the regulating plate is subjected to vibrations and the like from outside sources at the time of the recording or the reproducing, then the regulating plate is vibrated and it becomes difficult to perform the recording or the reproducing satisfactorily. To remedy these disadvantages, such an arrangement may be proposed that a regulating plate holder for holding the regulating plate is secured to a lid through a spring, whereby the regulating plate holder is positioned at a predetermined position of the main body of device through the resiliency of the spring so as to be closely attached thereto. With the above-described arrangement, in order to improve the accuracy in positioning of the regulating plate holder with respect to the main body of device, it is necessary to decrease the looseness in the positioning means as much as possible. However, when the looseness in the positioning means is decreased, it is necessary to raise the resiliency in order to ensure a close attachment between the regulating plate holder and the main body of the device. However, if the resiliency is raised, then there is a possibility that the regulating plate holder is deformed, whereby the delicate positional relationship between the regulating plate and the magnetic head is broken. In consequence, the regulating plate holder should be raised in rigidity, thus disadvantageously resulting in an increase in the force necessary to open or close the lid.

SUMMARY OF THE INVENTION

The present invention has been developed to obviate the above-described disadvantages of the prior art and has as its object the provision of a rotary magnetic disc device, wherein a regulating plate is positioned at a predetermined position with high accuracy relative to the position of the magnetic head and the regulating plate is not vibrated even when subjected to outside vibrations and the like.

To this end, the present invention contemplates a rotary magnetic disc device comprising:
  a main body of device wherein a rotary driving source and a magnetic head are provided;
  a lid openably supported on the main body of device;
  a regulating plate finely movably provided on the lid and located at a position opposed to the magnetic head, when the lid is closed, to dispose the magnetic disc along the magnetic head;
  magnets provided at least on either the main body of the device or the regulating plate, for attracting and fixing the regulating plate to the main body when the lid is closed; and
  positioning means for positioning the regulating plate at a predetermined position relative to the magnetic head when the lid is closed.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a magnetic disc device according to the present invention with reference to the accompanying drawings.

Figure 1:
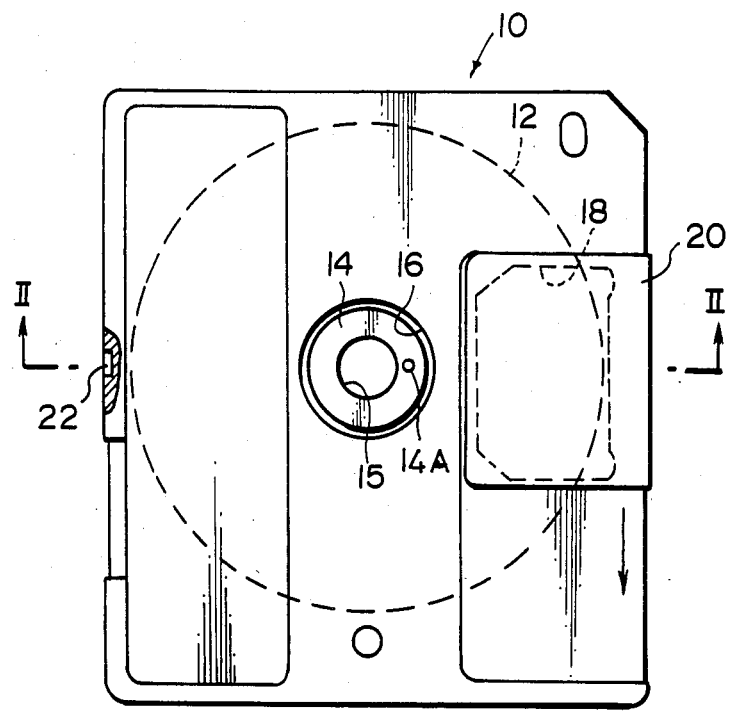
FIG. 1 is a plane view showing the magnetic disc pack used in this embodiment.
Figure 2:
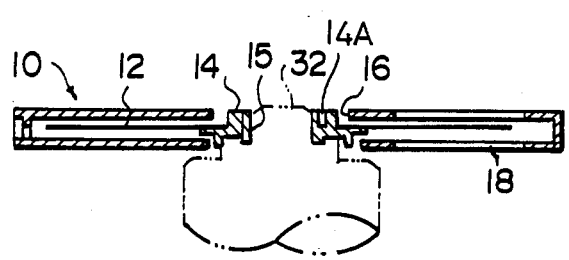
FIG. 2 is a sectional view taken along the line II—II in FIG. 1, showing the magnetic disc pack.

FIG. 1 is a plane view showing a magnetic disc pack used in a magnetic recorder or a reproducer in an electronic camera or the like, and FIG. 2 is a sectional view taken along the line II—II in FIG. 1. As shown in FIG. 1, the magnetic disc pack 10 is formed into a generally square shape and has rotatably mounted therein a magnetic disc 12 capable of recording thereon still image information and the like. The magnetic disc 12 is provided in the central portion of the disc pack 10 and contains a center core 14 as a reinforcing member, the center core 14 being exposed through a circular opening 16 of the magnetic disc pack 10. The center core 14 is provided with a PG (pulse generator) pin 14A. The magnetic disc pack 10 is formed with a window 18, at which is located a magnetic head to be described hereunder, the window 18 for the magnetic head being opened or closed by a slidable shutter 20. More specifically, before the magnetic disc pack 10 is inserted into an inner bucket to be described hereunder, the shutter 20 closes the window 18 to prevent dust from being attached to the magnetic disc 12. When the magnetic disc pack 10 is inserted into the inner bucket, the shutter 20 moves downward in FIG. 1 to open the window 18 for the magnetic head, whereby the recording in the magnetic disc 12 and the reproduction therefrom can be performed. An engageable recess 22 is formed at an end face opposite the shutter 20 of the magnetic disc pack 10. This recess 22 is used as a provisional lock for the magnetic disc pack 10 when the magnetic disc 12 is inserted into the inner bucket as will be described hereunder.

Figure 3:
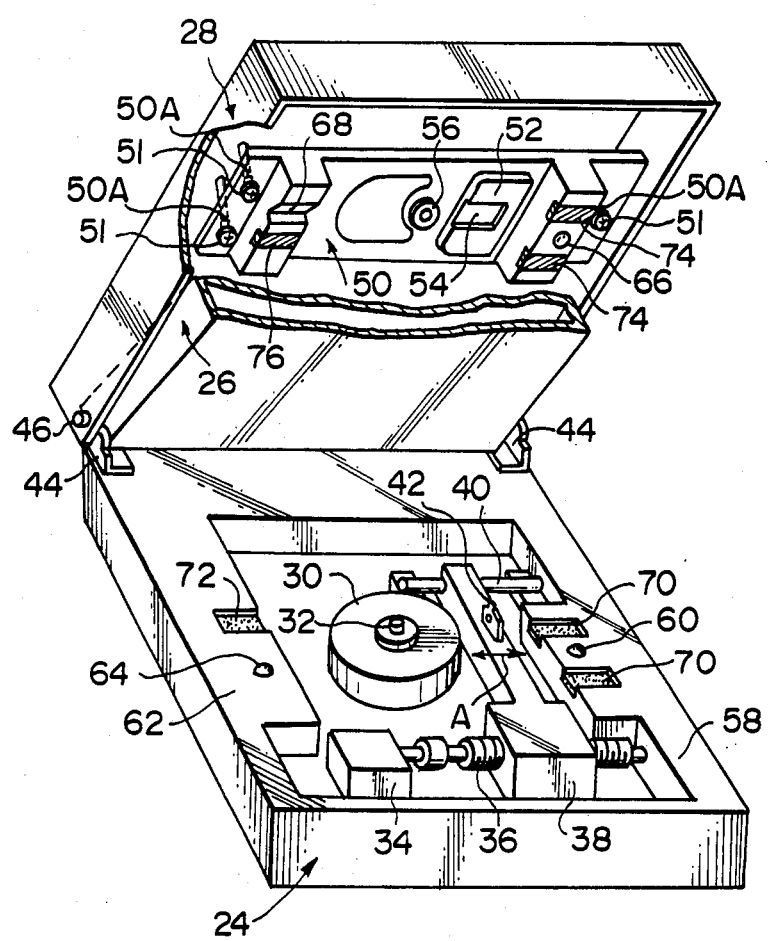
FIG. 3 is a perspective view showing the general arrangement of this embodiment.

FIG. 3 shows the magnetic recorder or reproducer in an electronic camera or the like, to which is applied the device for loading or unloading the magnetic disc pack according to the present invention. The magnetic recorder or reproducer includes a main body 24, an inner bucket 26 and a lid 28. Firstly, description will be given to the inner construction of the main body 24 of the magnetic recorder or reproducer. The main body 24 is provided therein with a motor 30 for driving a magnetic disc 12. A drive shaft 32 of this motor 30 is coupled into a center hole 15 of a center core 14 of the magnetic disc pack 10 as shown in FIG. 1 and rotates the magnetic disc 12 at a predetermined speed in the magnetic disc pack 10. In FIG. 3 is shown a motor 34 for driving a magnetic head, a lead screw 36 connected to an output shaft of this motor 34, a head carriage 38 threadably coupled to this lead screw 36 and guided by a guide shaft 40 and a magnetic head 42 provided on the head carriage 38. In consequence, when the motor 34 is rotated at a predetermined speed, the head carriage 38 is moved by a predetermined pitch in the axial direction of the guide shaft 40 by the rotation of the lead screw 36, whereby the magnetic head 42 moves in the radial direction of the magnetic disc 12, so that the still image information can be recorded or reproduced per track on the magnetic disc 12.

Figure 4:
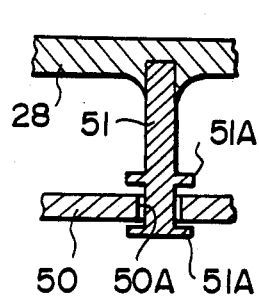
FIG. 4 is a partially sectional view showing the construction for mounting the regulating plate holder.

The main body 24 of the magnetic recorder or reproducer is provided at an end portion thereof with brackets 44, on which the inner bucket 26 and the lid 28 are pivotally supported by means of a pin 46. As shown in FIG. 4, the lid 28 is formed into a shape capable of housing the inner bucket 26. The lid 28 is biased by a torsional spring (not shown) in the opening direction of the main body 24 of the magnetic recorder or reproducer. Further, provided between the lid 28 and the inner bucket 26 is another spring (not shown), which biases the inner bucket 26 in a direction away from the lid 28. In consequence, in the state where the lid 28 is opened as shown in FIG. 3, the inner bucket 26 is separated from the main body 24 and the lid 28, whereby an opening (not shown) for receiving the magnetic disc pack 10 of the inner bucket 26 is formed.

A surface opposed to the main body 24 of the inner bucket 26 is formed with a plurality of openings for respectively receiving a rotary shaft 32 provided on the main body 24, a magnetic head 42 and a positioning pin provided on the main body 24 for positioning the main body 24 and the magnetic disc pack 10.

A regulating plate holder 50 is finely movably secured to the rear surface of the lid 28. More specifically, the regulating plate holder 50 is formed with mounting holes 50A, in which three pins 51 planted on the undersurface of the lid 28 are positioned to finely movably support the regulating plate holder 50. As shown in FIG. 4, the pins 51 are formed with flanges 51A, with the regulating plate holder 50 being interposed therebetween in the vertical direction, whereby the regulating plate holder 50 is finely movable in the vertical direction between the flanges 51A, and further, finely movable in the radial direction of the pins 51 owing to a clearance between the pins 51 and the mounting hole 50A. As shown in FIG. 3, the regulating plate holder 50 has a length equal to the substantially whole width of the main body 24, and is provided with a regulating plate 52 at a position opposed to the magnetic head 42 when the lid 28 is closed. The regulating plate 52 is formed with a groove 54 in the widthwise direction of the magnetic head 42. Furthermore, the regulating plate holder 50 is provided with a PG sensor 56 at a position close to the regulating plate 52. This PG sensor 56 is adapted to detect the PG pin 14A of the magnetic disc 12 rotated by the driving shaft 32. On the other hand, as shown in FIG. 3, a ball 60 is planted on a right side wall 58 of the main body 24 and a ball 64 is planted on a left side wall 62. The balls 60 and 64 position the regulating plate 52 and are coupled into a tapered hole 66 and a tapered groove 68 of the regulating plate 50, when the lid 28 is closed, to locate the regulating plate 52 at a predetermined position relative to the moving direction of the magnetic head 42. Additionally, the tapered groove 68 is formed into a groove-shape for relieving the regulating plate holder 50 at the time of positioning.

The right side wall 58 of the main body 28 is provided with magnets 70, which are disposed on opposite sides of the ball 60. The left side wall 62 is provided with a magnet 72 at a position close to the ball 64. On the other hand, on the regulating plate holder 50, magnetic materials 74 are opposed to the magnets 70 on opposite sides of the tapered hole 66, and a magnetic material 76 opposed to the magnet 72 is provided at a position close to the tapered groove 68.

Figure 5:
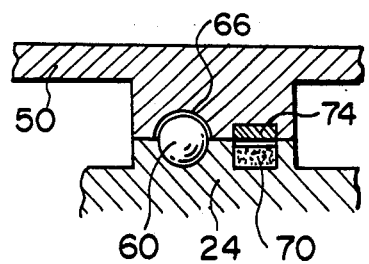
FIG. 5 is a partially sectional view showing the construction of the means for positioning the regulating plate.

The following is a description of one embodiment of the rotary magnetic disc device according to the present invention. First, in loading the magnetic disc pack, when the magnetic disc pack 10 is inserted into the inner bucket 26 in the state where the lid 28 is opened as shown in FIG. 3, an engaging pawl, not shown, is coupled into a recess 22 of the magnetic disc pack 10, whereby the magnetic disc pack 10 is provisionally locked in the inner bucket 26. Subsequently, when the lid 28 is pressed down toward the main body 24, the center core 14 is mounted to the driving shaft 32, whereby the magnetic disc 12 is brought into a state where it is rotatable by the driving shaft 32. When the lid 28 is closed, the balls 60 and 64 are coupled into the tapered hole 66 and the tapered groove 68 of the regulating plate holder 50, whereby the regulating plate 52 is positioned at a predetermined position. In this case, the regulating plate holder 50 is finely movably supported on the lid 28, so that the regulating plate holder 50 can be moved to a predetermined position guided by the balls 60 and 64. Furthermore, as partially shown in FIG. 5, the regulating plate holder 50 is attracted by the magnets 70 and 72 on the sides of the main body 24, so that, even if vibrations and the like from outside sources are applied to the rotary magnetic disc device, the regulating plate 52 can be accurately positioned relative to the magnetic head 42, without vibrating the regulating plate 50.

In the embodiment described above, the main body 24 of device is provided with the magnets 70 and 72, and the regulating plate holder 50 is provided with the magnetic materials 74 and 76. However, the main body 24 of device may be provided with the magnetic materials and the regulating plate holder 50 may be provided with the magnets. Alternatively, both the main body 24 and the regulating plate holder 50 may be provided with magnets for attracting and fixing to each other. Furthermore, if the magnets on the side of the main body and the magnets on the side of the regulating plate holder are slightly shifted from each other, then the attracting force also works sideways, whereby the regulating plate holder is put aside, so that looseness and the like are decreased at the time of positioning.

In the above embodiments, the regulating plate holder 50 and the regulating plate 52 are formed separately of each other, and thereafter, fixed to each other. However, the regulating plate holder 50 and the regulating plate 52 may be integrally formed from the beginning.

In the above embodiment, the positioning means is constituted by the balls for positioning, the tapered hole and the tapered groove. However, the positioning means may be constituted by pins for positioning and holes for positioning.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A rotary magnetic disc device comprising:
    a main body of device wherein a rotary driving source and a magnetic head are provided;
    a lid openably supported on the main body of device;
    supporting means for pivotally supporting said lid on said main body;
    a regulating plate movably provided on said lid and located at a position opposed to said magnetic head, when said lid is closed, to dispose a magnetic disc along said magnetic head;
    mounting means for movably mounting said regulating plate on said lid;
    a plurality of magnets located on one of said main body of the device and said regulating plate;
    a plurality of magnetic materials provided on the other one of said main body of the device and said regulating plate, for attracting and fixing the regulating plate to the main body of the device when the lid is closed; and
    positioning means for positioning the regulating plate at a predetermined position relative to said magnetic head when the lid is closed.

2. A rotary magnetic disc device as set forth in claim 1, wherein said supporting means comprises pins, which are loosely coupled into holes of the regulating plate, to thereby movably support the regulating plate.

3. A rotary magnetic disc device as set forth in claim 2, wherein said positioning means comprises at least two balls for positioning, which are provided on either one of the main body of device and the regulating plate, and a tapered hole and a tapered groove capable of receiving said balls, which are provided on the other.

4. A rotary magnetic disc device as set forth in claim 3, wherein said tapered groove is formed into a generally V-shape in cross section and disposed in the moving direction of said magnetic head.

* * * * *